Dec. 13, 1938.   J. W. OW ET AL   2,140,371
CONTROL APPARATUS
Filed Nov. 7, 1936   4 Sheets-Sheet 1

Fig. 1.

WITNESSES:
Michael Stark
G. S. Parker

INVENTORS.
Joseph W. Ow
and Ernest K. Read.
BY
Ralph H. Swingle
ATTORNEY

Dec. 13, 1938.  J. W. OW ET AL  2,140,371
CONTROL APPARATUS
Filed Nov. 7, 1936  4 Sheets-Sheet 2

Fig. 2.

WITNESSES:
Michael Stark
G. S. Parker

INVENTORS.
Joseph W. Ow
and Ernest K. Read
BY
Ralph H. Swingle
ATTORNEY

Dec. 13, 1938.                J. W. OW ET AL                    2,140,371
                              CONTROL APPARATUS
                             Filed Nov. 7, 1936            4 Sheets-Sheet 4

WITNESSES:                                           INVENTORS.
  Michael Stark                                    Joseph W. Ow
  G. L. Parker                                   and Ernest K. Read
                                                        BY
                                                   Ralph H. Swingle
                                                        ATTORNEY Patented Dec. 13, 1938

2,140,371

UNITED STATES PATENT OFFICE 2,140,371

CONTROL APPARATUS

Joseph W. Ow, Wilkinsburg, and Ernest K. Read, East Pittsburgh, Pa., assignors to Westinghouse Electric & Manufacturing Company, East Pittsburgh, Pa., a corporation of Pennsylvania Application November 7, 1936, Serial No. 109,702

29 Claims. (Cl. 200—92)

Our invention relates to control apparatus in general and more particularly to control apparatus for circuit breakers or switches.

Circuit breakers or switches installed in electrical power transmission lines or feeder network systems usually require some form of control apparatus for operating the same in order to meet certain requirements.

The circuit breakers designed for such use are usually of relatively large size and considerable energy is necessary to close the breaker; particularly in the case of circuit breakers which are biased to open position by gravity and accelerating springs or both. It is extremely important that the breakers be closed, after opening in response to overload conditions, as rapidly as is possible in order to prevent unduly long interruptions to service.

Heretofore, it has been the general practice to use a solenoid or motor device for directly closing the breaker. This method while satisfactory in some respects has the important disadvantage that a relatively large amount of current and power is necessary to attain a rapid movement of the breaker to closed position, particularly when a large circuit breaker is involved. It has also been proposed to store energy in a device over a relatively long period of time by a low input device and then to utilize the energy so stored to control the breaker. This method allows a large amount of power to be expended in short periods of time to operate the breaker while a low input device may be operated over an extended period of time to store the power. The mechanisms for carrying out the above method have been objectionable for several reasons: One being that they occupy considerable space and another that they have been relatively inefficient due to the large number of translating mechanism necessary.

It is accordingly an object of our invention to provide an improved form of control apparatus for circuit breakers.

Another object of our invention is to provide an improved control apparatus for rapidly closing a circuit breaker which requires a minimum number of parts.

Another object of our invention is to provide an apparatus for controlling a circuit breaker which apparatus occupies a relatively small space as compared to other control apparatus of comparable power.

Another object of our invention is to provide an energy storing device for closing a circuit breaker with an improved means for storing energy in said device.

Another object of our invention is to provide an energy storing device for closing a circuit breaker with an improved means for storing energy in the device and releasably holding the energy so stored.

Another object of our invention is to provide a control apparatus including an energy storing device for closing a circuit breaker with improved means for storing energy in said device, and for transmitting the energy to the breaker operating member.

Another object of our invention is to provide an improved control apparatus for circuit breakers in which the breaker is trip free in any position of the apparatus.

Another object of our invention is to provide an improved form of control apparatus for a circuit breaker utilizing an energy storing device for closing the breaker in which energy is automatically restored immediately after the breaker has closed and which is held in readiness for the next closing operation.

Another object of our invention is to provide an improved control apparatus for a circuit breaker characterized by the use of an energy storing device, which occupies a minimum amount of space, for closing the breaker through a trip free lever system which is capable of tripping the breaker in any position of the energy storing device.

Another object of our invention is to provide an improved form of control apparatus characterized by the use of a strong spiral power spring which is charged, held in charged position and released to discharge its energy through a trip free lever mechanism to close the breaker.

Another object of our invention is to provide a control apparatus for a circuit breaker characterized by the use of a charged spiral power spring releasable to close the breaker, and a mechanism for automatically recharging the spring immediately after each release thereof.

The novel features that we consider characteristic of our invention are set forth with particularity in the appended claims; the invention itself, however, both as to structure and operation, together with additional objects and advantages thereof, will best be understood from the following detailed description of a specific embodiment when read in connection with the accompanying drawings, in which

The apparatus of our invention comprises, in general, a base, a frame or carcass for supporting the various mechanisms of the apparatus, an energy storing device in the form of a spiral power spring, a motor means for storing energy in the spring, a lever mechanism for coupling the spring to a breaker operating member and circuits for controlling the apparatus.

Figure 1:
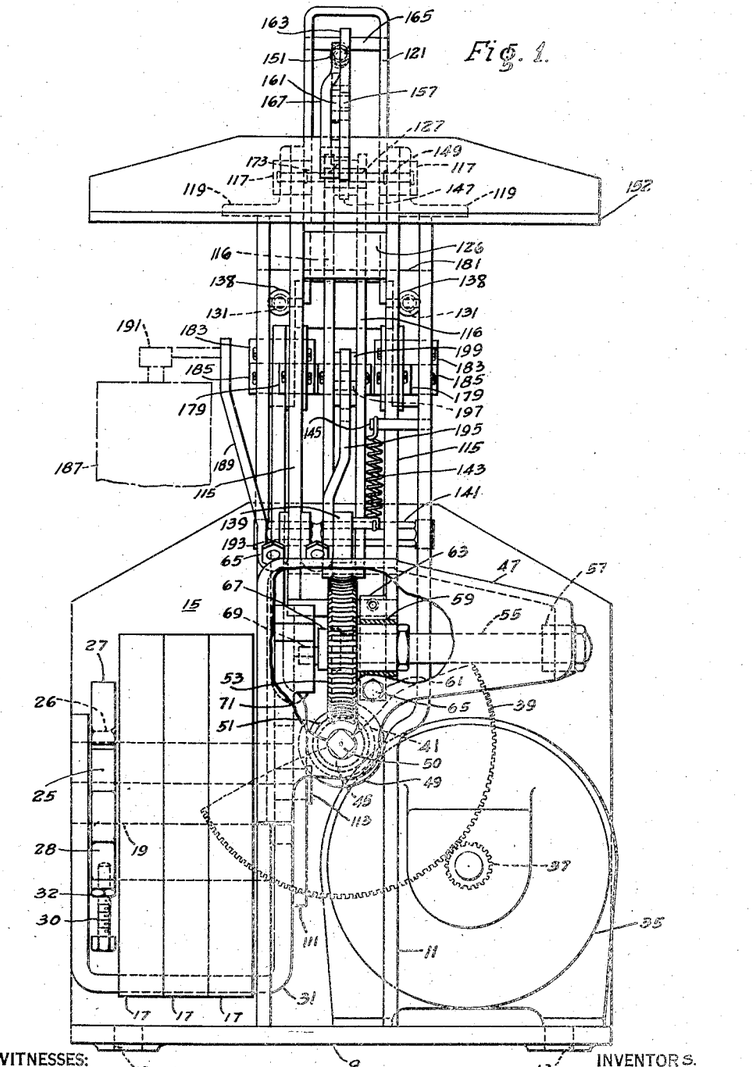
Figure 1 is a front elevational view of the control apparatus embodying the features of our invention.
Figure 2:
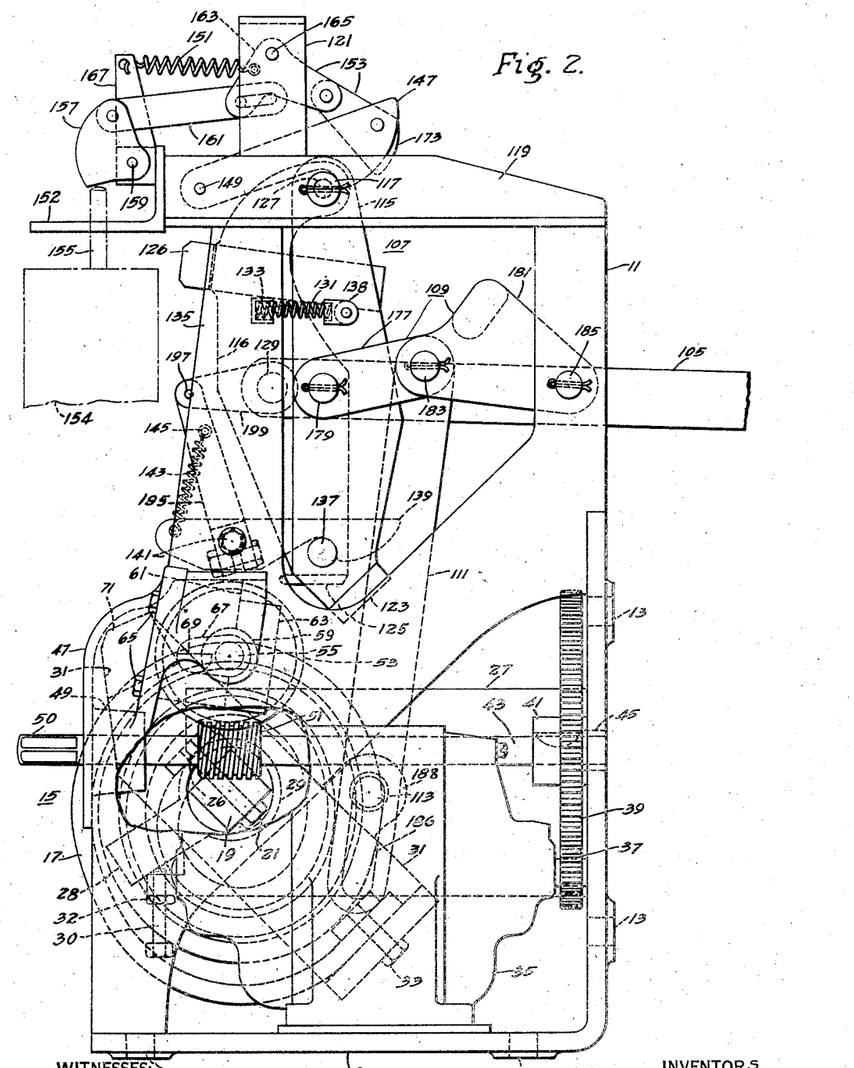
Fig. 2 is a side elevational view of the control apparatus of our invention illustrated in Fig. 1 viewed from the right side thereof.

Referring to Figs. 1 and 2, the apparatus is mounted on a base 9 which carries a carcass or frame indicated generally at 11. The base and carcass may be of any suitable material, preferably of metal. The frame may be secured to the base in any suitable manner as by nut and bolt assemblies, or by welding. Openings 13 are provided in the base for accommodating securing means for mounting the apparatus on a floor, wall or other form of rigid support. An energy storing device for supplying the energy for closing the breaker is mounted on the frame. The energy storing device, indicated generally at 15, comprises a plurality of spiral power springs 17, the inner ends of which are secured to a squared portion of a shaft 19 (see Fig. 5) by means of nut and bolt assemblies 21. The shaft 19 has a rounded portion mounted in a bearing 23 at one end thereof. The other end of the shaft 19 is mounted in an adjustable bearing 25 carried in an opening 26 in a portion of the frame 27. The adjustable bearing consists of a lever arm 28 having a circular hub 29 at one end thereof provided with a square opening to receive a square portion of the shaft 19. The lever may be rotated and held in different positions in the opening 26 to introduce an initial tension in the springs 17. Any suitable means may be provided for holding the lever arm 28 in any desired position of adjustment for introducing an initial adjustment in the tension of spring 17. In the form shown a set screw 30 is passed through a portion of the frame 27, the free end of the screw engaging the lever arm 28. A lock nut 32 is provided for locking the screw in adjusted positions. The outer ends of the springs 17 are secured to the bight of a U-shaped bail 31 by means of nut and bolt assemblies 33, the springs being disposed between the legs of the bail. The legs of the bail are provided with openings for rotatably mounting it on cylindrical portions provided on the shaft 19. Partial rotation of the bail in a counterclockwise direction as viewed in Fig. 2 will flex the springs to store energy therein.

Figure 5:
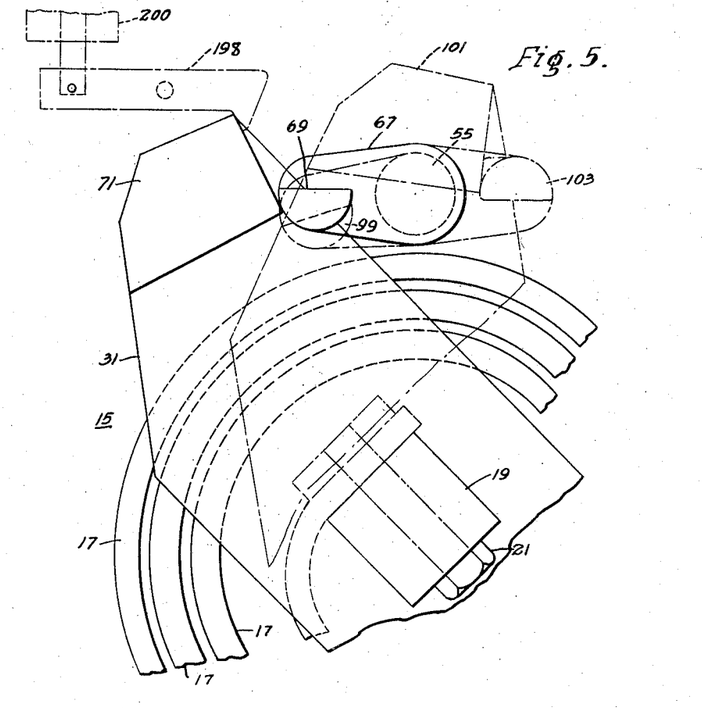
Fig. 5 is a view of a portion of the apparatus illustrating the cycle of the crank arm and the manner in which it rotates the spring bail for storing and holding energy in the spring, a modified form of latching means for holding energy stored in the spring being shown in dotted lines.

An operating means is provided for storing and holding energy in the spring. The operating mechanism which will now be described includes a motor 35 mounted on the base 13. A gear 37 secured to the motor shaft meshes with a large gear 39 carried by hub 41 which is keyed to a shaft 43. The shaft 43 is rotatably mounted at one end in a bearing 45 carried by the base 13. An open sided casing 47 is secured to a portion of the frame by any suitable means and is provided with a bearing 49 for rotatably receiving the other end of the shaft 43. The shaft extends through the bearing 49 and is provided at the free end thereof with a square or hexagonal portion 50 adapted to receive a crank, not shown, for manually operating the shaft to flex the springs to store energy therein. The crank (not shown) for the shaft 43 in addition to providing a manual means for flexing the springs 17 may also be used to manually move the breaker operating member, through the springs 17 when released to any desired position for repairs or for adjustment purposes. The shaft 43 has a worm 51 keyed thereto or formed integral therewith. The worm 51 meshes with a worm gear 53 secured for rotation to a shaft 55. The shaft 55 is rotatably mounted in a bearing 57 (see Fig. 1) carried by the casing 47, and in a split bearing 59, one part 61 of which is carried by or formed integral with the casing 47. The other portion 63 of the split bearing 59 is secured to the portion 61 by means of nut and bolt assemblies 65. The worm gear 53 is provided with a radial recess on one side thereof for the reception of a crank arm 67. The crank arm 67 may be formed integral with the shaft 55 or secured thereto by any suitable means. The outer end of the crank arm carries a projecting crank lug 69 of semi-circular shape, as more clearly shown in Fig. 5. The U-shaped bail 31 has a projecting lug 71 secured to one leg thereof. The lug 71 is adapted to be engaged and moved by the lug 69 upon rotation of the crank arm 67 to cause partial rotation of the bail for flexing the springs to store energy therein. The lug 69 and the crank arm 67, in addition to providing the means for rotating the bail, also function as a form of latch means for holding the bail 31 in position with the springs 17 in flexed or charged condition as shown by the full lines in Fig. 5. The shaft 55 is adapted to be cyclically operated, as is more clearly illustrated in Figs. 5 and 6. The cyclic operation of the shaft 55 is effected by a control circuit of the motor. The normal or starting position of the crank arm 67 and lug 69 is shown in full lines in Fig. 5, in which position the bail is held by the lug 69 engaging the lug 71. In this position of the parts, the springs are in flexed or charged position. The cyclic operation of the shaft 55 and crank arm 67 is effected by means of a conducting disc 73 (see Fig. 6) carried by the shaft 55 for rotation therewith. The disc 73 is provided with an insulating segment 75 in the periphery thereof. A brush 77 is mounted to engage the periphery of the disc 73, the brush 77 being connected to one side 79 of an auxiliary supply circuit 81 by means of a conductor 83. One terminal of the motor 35 is connected to the other side 85 of the supply lines 81 by means of a conductor 87. The other terminal of the motor is connected by a conductor 89 with the conducting disc 73 by any suitable form of rotary connecting means. The insulating segment 75 is so positioned in the disc 73 that it engages the brush 77 to open the motor circuit when the crank arm 67 is in the holding position illustrated in Fig. 5. It will thus be seen that normally the springs are in flexed or energy stored position and held in such position by the crank arm and lug 69. A shunt circuit 91, 93, 95 is shunted around the conducting disc 73 and the brush 77. The shunt circuit includes a manual control switch 97 for initially starting the motor. The cyclically operated switch comprising the conducting disc 73 and the brush 77 may be replaced if desired by various other forms of cyclically controlled switches. For example a pair of normally closed separable contacts may be substituted for the disc and brush shown, and an insulating arm secured to the shaft 55 for rotation therewith, the insulating arm being adapted to be interposed between the contacts to open the motor circuit at the instant that the crank plug is in the proper position. The cycle of operation is as follows: Upon closing the manual switch 97, the circuit for the motor is established as follows: From line 85 through conductor 87, motor 35, conductor 89, conductors 91, 93, manual control switch 97, and conductors 95 and 83 to the other side 79 of the supply line 81. During the initial movement of the motor the insulating segment 75 is disengaged from the brush 77 and a new circuit is established for the motor through the brush 77 and disc 73. Rotation of the motor 35 drives the shaft 55 through the gearing 37, 39, 51, 53 and causes rotation of the crank arm 67 in a counterclockwise direction, as viewed in Figs. 2 and 5. During the first part of the rotation of the crank arm 67, the lug 69 is moved to the dotted line position 99, as shown in Fig. 5, thus releasing the bail 31 and allowing the springs to rotate the bail in a clockwise direction to a position 101. In the meantime the motor continues to rotate and drives the crank arm 67 and lug 69 to a position 103 in which the lug 69 reengages the lug 71. Continued rotation of the motor causes the crank arm 67 and the lug 69 to partially rotate the bail 31 in a counterclockwise direction to again flex the springs and store energy therein. When the motor has driven the crank arm back to its original position, as shown in full lines in Fig. 5, the insulating segment 75 will have engaged the brush 77 to open the motor circuit and thus stop rotation of the shaft 55. The springs 17 are now again in their energy stored or flexed position and held in such position by the lug 69. The movement of the spring bail 31 in a clockwise direction when released by starting the motor, is transmitted through a lever mechanism, which will now be described, to effect a closing operation of the breaker.

The lever mechanism for transmitting the energy stored in the springs 17 to the breaker operating member 105 comprises, in general, a compound lever indicated generally at 107, a toggle linkage 109, a slotted lever 111 and a pin 113 secured for movement with the spring bail. The compound lever comprises a pair of main outer levers 115 and a pair of inner levers 116. The outer levers are pivoted at their upper ends to a portion of the frame 11 by means of pivot pins 117, carried by lugs 119 and a U-shaped auxiliary frame piece 121. The lower ends of the main or outer levers 115 are connected by a cross piece 123 which may be formed integral with the levers. The pair of inner levers 116 are connected at their lower ends by a cross piece 125 which may be formed integral with the inner levers and are pivoted to the outer levers 115 by means of a pivot pin 137. The inner levers 116 extend upwardly and are curved as shown in Fig. 2, so that their free ends are positioned substantially in line with the axis of rotation of the outer levers. The free ends of the inner levers 116 rotatably support a roller 127 and are connected thereby. A U shaped strap 126 has its legs secured to the outer levers 115 so that the bight thereof forms a stop for the inner levers 116. A pivot pin 129 is mounted in openings provided in the inner levers adjacent the mid point thereof. One end of the breaker operating member 105 extends between the inner levers and is pivotally connected to the pin 129. The outer levers 115 are biased in a counterclockwise direction about their pivot pins 117 by means of a compression spring 131 held in tension between sockets 133 mounted on a portion 135 of the frame 11 and pivoted sockets 138 carried by the outer levers. The outer levers are releasably held in normal position against the bias of the springs 131 by a latch member 139 pivoted on a circular portion of a hexagonal shaft 141. The latch is biased to latch engaging position by means of a tension spring 143 connected in tension between the free end of the latch 139 and a pin 145 carried by the portion 135 of the frame 11.

Figure 3:
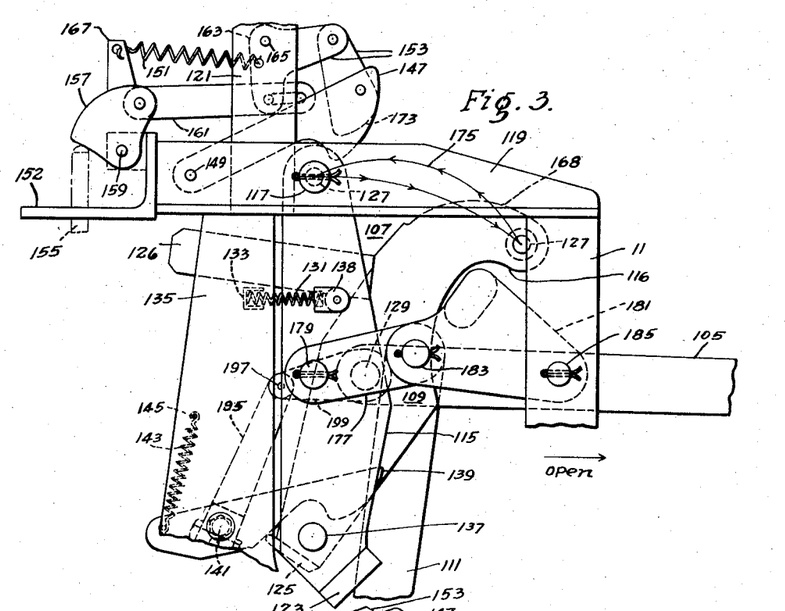
Fig. 3 is a side elevational view of a portion of our apparatus showing a momentary position of the lever mechanism thereof immediately after energization of the trip magnet, the circuit breaker having moved to the open circuit position.
Figure 4:
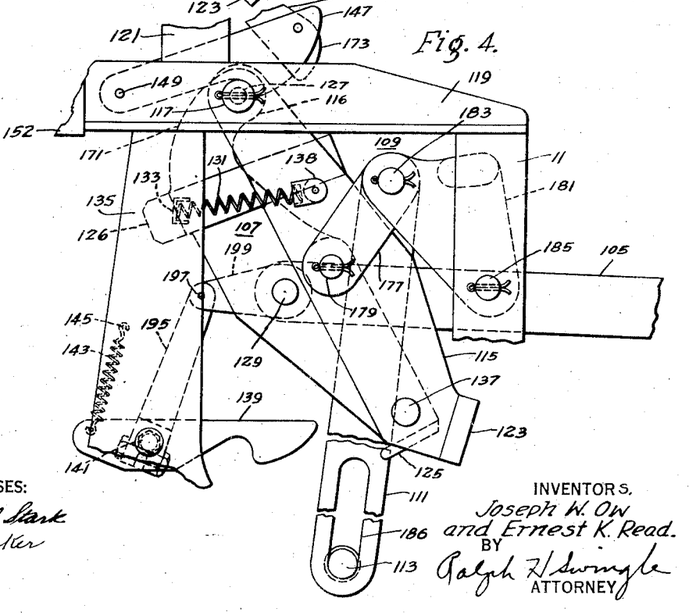
Fig. 4 is a side elevational view of the portion of the apparatus illustrated in Fig. 3 with the lever mechanism in the retrieved position a short interval after the completion of the tripping operation.
Figure 6:
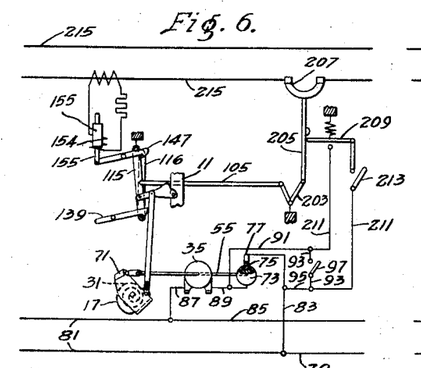
Fig. 6 is a diagrammatic view of the form of apparatus shown in Figs. 1 through 4, together with a wiring diagram to illustrate one form of its connection in the control circuit; and, Fig. 7 is a diagrammatic view of the apparatus embodying the latch means shown in Fig. 5, together with a wiring diagram to illustrate the connection of the apparatus in the control circuit.

In the position of the levers shown in Fig. 2, the operating member 105 of the breaker is in the closed circuit position. The circuit breaker which is shown diagrammatically in Fig. 6, is of the type which is biased to open position by means of gravity or accelerating springs (not shown). In order to hold the breaker in closed position against its bias, a latch 147 is provided for engaging and releasably holding the roller 127. The latch 147 is pivoted to the main frame by means of the pivot pin 149. The latch 147 is biased to latch engaging position by means of a spring 151 and a toggle linkage 153. A trip device is provided for tripping or releasing the latch 147 in response to predetermined overload conditions in the circuit controlled by the breaker. The trip device comprises a solenoid 154 mounted on a portion of the frame 11. The solenoid is provided with a movable core 155 which is moved upwardly upon energization of the solenoid to engage the bell crank lever 157 pivoted at 159 to a portion of the frame. A link 161 pivotally connects the bell crank lever 157 with a second bell crank lever 163 by means of a pin and slot connection. The bell crank lever 163 is pivoted about a pivot pin 165 and constitutes one arm of the toggle linkage 153. The spring 151 is connected in tension between a support 167 and bell crank lever 163. When the solenoid 154 is deenergized, the tension spring 151 biases the toggle linkage to operative extended position to hold the latch 147 in latch engaging position with the roller 127. Upon energization of the solenoid 154 in response to a predetermined overload in the circuit controlled by the breaker, the core 155 moves the bell crank lever 157 and causes the lever 161 to collapse the toggle linkage 153 and lift or release the latch 147 from engagement with the roller 127. When the latch 147 is released, the circuit breaker being biased to open position causes movement of the operating member 105 toward the right, as viewed in Fig. 2 and since the operating member is connected by the pivot pin 129 to the inner levers 116, the inner levers are rotated in a clockwise direction to a position 168 as shown in Fig. 3. The trip device illustrated in connection with the apparatus is of the current responsive type. Additional trip devices responsive to other conditions such as over or under voltage together with a manually controlled shunt trip may be provided if desired. The additional trip devices may be mounted on the cross support 152 and would comprise solenoids or electromagnets for controlling the movement of a trip bar connected for movement with the bell crank 157 so that actuation of any of the trip devices would cause movement of the bell crank 157 to release the latch 147. Just prior to the time that the inner levers 116 arrive at the last mentioned position in which the breaker is in full open position, the cross piece 125 of the inner levers 116 engages and moves the latch 139 to the released position, as shown in Fig. 3. When the latch 139 is released, as described above, the springs 131 cause movement of the main or outer levers 115 in a counterclockwise direction about their pivot pins 117 to a position 169, as shown in Fig. 4. During the movement of the outer levers 115 to the last mentioned position, the inner levers 116 are rotated about the pivot pin 129 to a retrieved position 171 (see Fig. 4). During this retrieving movement of the inner levers, the free ends of said levers engage a cam surface 173 provided on one of the toggle links 153, and causes the collapse of the toggle linkage which had been previously straightened out by the tension spring 151 after deenergization of solenoid 154. The breaking of the toggle linkage 153 allows the roller to pass under the latch 147. Immediately after the free ends of the inner levers 116 pass the cam surface 173, the latch 147 is moved into latching position to reengage the roller 127 by the tension spring 151. The compound levers are now in the retrieved position with the circuit breaker in the open circuit position. It will be noted that during the tripping operation, the roller 127 traversed an outgoing path 173 and a retrieving path 175, as shown in Fig. 3. A return movement of the compound levers from the position shown in Fig. 4 to that shown in Fig. 1 will move the operating member 105 toward the left, as viewed in Fig. 4, to effect a closing operation of the circuit breaker. This closing movement of the lever is effected by rotation of the spring bail when released through a connecting means which will now be described. The connecting means comprises a pair of toggle links 109, one pair of links 177 thereof being pivotally connected at one end to pivot pins 179 carried by intermediate portions of the outer levers 115. The other pairs of links 181 of the toggle linkage 109 are pivotally connected at one end to the free end of the toggle links 177 by knee pivot pin 183 and at their other ends to a portion of the main frame by means of a pivot pin 185. A main lever 111 is pivotally connected to the toggle links by the knee pivot pin 183 at one end, the other end of the main lever being provided with a slot 186 adapted to accommodate the pin 113 which is carried by a projecting ear 188 formed integral with one leg of the bail. Movement of the compound levers 115 and 116 to the position shown in Fig. 4 in response to a tripping operation causes the toggle linkage 109 to collapse as shown, which moves the lever 111 in an upward direction causing the pin 113 to be positioned at the lower end of the slot 186. The breaker is now in the open circuit position and the apparatus in condition to close the breaker. When the bail is released in the manner previously described, it rotates in a clockwise direction and causes the pin 113 to move the main lever 111 downwardly to cause a straightening of the toggle linkage 109. This straightening of the toggle linkage 109 causes a rotation of the compound levers 115 and 116 in a counterclockwise direction about the axis of the pins 117 to the position shown in Fig. 2, in which the latch 139 reengages the pivot pin 137. It will thus be seen that downward movement of the lever 111 causes a movement of the operating member 105 toward the left to effect a closing operation of the breaker.

The apparatus may be provided with an auxiliary switch or switches 187 (see Fig. 1) adapted to be operated upon movement of the breaker operating member 105 to the closed or open circuit position. The operation of this switch in conjunction with the movement of the breaker operating member 105 is effected by means of a lever 189 connected to the auxiliary switch operating member 191 at one end and having a bent portion 193 at the other end provided with openings of hexagonal shape to receive the hexagonal shaft 141. A second lever 195 has a similar bent end portion provided with hexagonal openings to receive another portion of the hexagonal shaft 141, the free end of the lever 195 being connected by a pin 197 with a link 199 which is in turn pivoted to the pivot pin 129 carried by the inner levers 116. It will be seen from Figs. 2 and 3 that movement of the operating member 105 to the right, which effects opening of the breaker, will rock the levers 189 and 195 to operate the auxiliary switch 187 through the connecting means 141, 189, 191. This auxiliary switch may comprise a multi-pole switch structure for controlling signal circuits or for controlling the operation of the motor circuit.

Figure 7:
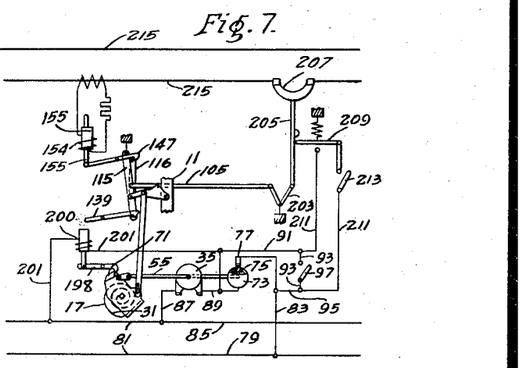

In the form of apparatus shown in Figs. 1 and 2, the crank arm and lug 69 are arranged to function as a latch for holding the spring bail in energy stored position in addition to rotating the same to store energy in the springs 17. If desired, the position of the brush 77 or the position of the disc 73 may be slightly shifted so that the normal or starting position of the cycle of the shaft 55, the crank 67 and the lug 69 is such that the lug 69 just clears the lug 71, as indicated by the dotted line position 99 in Fig. 5. In this case, an electromagnetically controlled latch 198 is provided for holding the spring bail in the charged position in which the springs are flexed with energy stored therein. Fig. 7 shows a diagrammatical view of the apparatus embodying the last mentioned form of latch means. The same reference characters have been used in Fig. 7 to represent the corresponding elements disclosed in Fig. 6. The apparatus embodying the electromagnetically controlled latch 198 for holding the spring bail, operates in the same manner as the apparatus shown in Figs. 1, 2 and 6, except that the electromagnet 200 for controlling the latch 198 is adapted to be energized simultaneously with the energization of the motor circuit. This is effected by connecting the electromagnet 200 in a circuit 201 connected in parallel with the motor circuit (see Fig. 7). Hence, when the manual control switch 97, referring to Fig. 7, is closed a motor circuit and a circuit to the electromagnet 200 are simultaneously energized so that the latch is moved to the released position to release the spring bail and the motor is simultaneously operated to operate the crank arm 67 through a cycle to restore energy in the spring means after the breaker has been closed.

Referring to Figs. 6 and 7, the connection of the operating member 105 to the breaker is illustrated in a diagrammatic manner. The operating member 105 is pivotally connected to a bell crank lever 203 which is, in turn, pivotally connected to the breaker rod 205 in such a manner that movement of the operating member 105 to the left causes upward movement of the breaker rod 205 to effect a closing of the breaker 207. The breaker, as has previously been mentioned, is biased to the open circuit position by gravity or by an accelerating spring (not shown) or by both.

If desired, provision may be made for automatically reclosing the breaker as soon as it has moved to the open circuit position. Referring to Figs. 6 and 7, the automatic reclosing may be effected by means of a switch 209 (or by means of the auxiliary switch 187) which is adapted to be closed when the breaker reaches open position. The switch 209 being connected in a shunt connection 211 around the manual control switch 97, a switch 213 may be provided in thus shunt connection to render the automatic reclosing feature inoperative. The switch 213 may be operated to open position in response to a certain number of reclosing operations to render the automatic reclosing means inoperative or, if desired, the switch 213 may be controlled manually.

The operation of the apparatus shown in Figs. 1, 2 and 6 is briefly as follows: With the parts in the position shown in Figs. 1, 2 and 6, that is, with the breaker in closed position, if an overload occurs on the circuit 215 controlled by the breakers 207, the solenoid 154 will operate to lift the latch 147 from engagement with the roller 127, thus freeing the inner levers 116. The breaker will open under its own bias and move the operating member 105 to the right carrying the inner levers to the position 168 shown in Fig. 3. The inner levers in moving to the position 168 will cause the cross piece 125 to release the latch 139, thus freeing the lower end of the outer levers 115. Movement of the operating member 105 to the right will rock the lever 189 to effect operation of the auxiliary switch 187. When the latch 139 releases the pin 137, the main or outer levers 115 will be rotated in a counterclockwise direction under the bias of the springs 131. Rotation of the outer levers 115 in a counterclockwise direction will cause the retrieving motion of the inner levers 116 to a position in which the roller 127 is reengaged under the latch 147. The compound lever comprising the outer levers 115 and the inner levers 116 are now in the retrieved position, as shown in Fig. 4. Movement of the outer lever to the retrieved position causes collapse of the toggle links 109 and resulting in upward movement of the main lever 111, so that the pin 113 is positioned at the lower end of the slot 186. The apparatus is now in condition for reclosing the circuit breaker. The closing operation is effected by closing the manual control switch 97 to energize the motor circuit. Rotation of the motor 35 causes the crank lug 69 to release the spring bail 21 in the manner previously described. The bail being released, the springs 17 unwind and rotate the bail in a clockwise direction to exert a powerful downward thrust upon the pin 113 to cause a rapid downward movement of the main lever 111. This downward movement of the lever 111 causes the toggle links 109 to straighten and move the compound lever back to its original position as shown in Fig. 2, which movement of the compound levers causes the operating member 105 to be moved to the left to effect a rapid closing operation of the circuit breaker. In the meantime the crank arm 67 continues to rotate through its cycle and causes reengagement of the lug 69 with the lug 71 and with further rotation, rotates the bail back to its original position to flex the springs and hold the spring bail. It will thus be seen that energy is automatically restored in the springs immediately after the breaker has been closed so that the apparatus is in condition to effect a subsequent closing operation should the breaker again be opened. During the winding or energy storing operation of the crank, which causes counterclockwise rotation of the spring bail, the pin 113 is moved from the bottom of the slot 186 to the top thereof. The parts are now in the original or normal position as shown in Fig. 2, and the apparatus is in a condition to effect another closing operation. It will be noted at this point that the apparatus is trip free in any position of the parts by reason of the compound lever and the slot 186 in the main lever 111. For example, if during downward movement of the lever 111 to close the breaker, an overload should occur, such as would cause operation of the solenoid coil 154, the latch 147 would be raised to free the roller 127. Downward movement of the main lever 111 will continue, but the inner levers 116 would be free to move under the breaker bias to an open circuit position to allow the breaker to open. If desired, the apparatus may be connected in the manner shown in Fig. 6 to effect automatic reclosing of the breaker in response to its movement to the open circuit position. As has been previously pointed out, this is effected by closing the control switch 213 to prepare the shunt circuit 211 for operation by the switch 209 (or by the auxiliary switch 187). In this case, when the breaker reaches the open position, the switch 209 will be closed to energize the motor circuit to effect the closing operation described above.

The operation of the apparatus embodying the latch 198, shown in Figs. 5 and 7, is substantially similar to the operation of the apparatus shown in Figs. 1, 2 and 6, except that the release of the spring bail for effecting a closing operation is effected by energization of the solenoid 200. The motor circuit of this modification is energized simultaneously with the energization of the solenoid 200 so that as soon as the bail is released by the latch 197, the motor starts its cycle to restore energy in the springs. When the bail has been rotated to the energy stored position, it is reengaged by the latch 198 and the motor circuit is automatically opened by the cyclic controlled switch 73, 77.

The motor may be of relatively small size, and the arrangement of the gears such that the motor completes its energy storing cycle in approximately 10 seconds. The size of the motor and the arrangement of the gears may be changed, however, to meet the particular requirements or needs. The number of spiral springs may be increased or decreased depending on the amount of power desired.

It will thus be seen that we have provided an improved form of control apparatus in which a large amount of energy may be stored for closing the breaker by means of a small input motor, the arrangement being such that the energy is immediately restored in the device after release, so that the apparatus is in a condition to effect a rapid subsequent closing operation. By this arrangement, it is not necessary after the breaker has been opened to wait until energy has been restored in the energy storing device before a subsequent closing operation can be effected.

By the use of spiral springs and the specific arrangement for storing energy therein, we have effected a considerable reduction in the space necessary for the apparatus as compared with the amount of space utilized by other forms of control apparatus for comparable power. Our control apparatus also provides an improved transmitting means for transmitting the energy from the energy storing device to the breaker operating member which means is trip free in any position of the parts, thus providing a desirable safety factor.

While a specific form of the invention has been illustrated, it is obvious that various changes and modifications may be made without departing from the spirit of the invention as set forth in the following claims.

We claim as our invention:

1. In a control apparatus for a switch, a switch operating member, a spiral power spring, rotatable means directly engageable with one end of said spring for winding said spring to store energy therein, means for releasably holding said spring in wound position, a trip free connecting means between said spring and said operating member for transmitting the energy when said spring is released to said operating member to close said switch, and means for releasing said holding means.

2. In a control apparatus for a switch, the combination of a switch operating member movable to close the switch and biased to open the same, a spiral power spring, rotatable means for rotating one end of said spring to wind the spring and store energy therein, means for releasably holding said spring in wound position with energy stored therein, a trip free lever mechanism between said spring and said operating member for transmitting the energy in said spring when released to said operating member to close the switch, means for releasing said holding means and for automatically rewinding said spring after it has effected closing of the switch.

3. In a control apparatus for a circuit breaker an operating member movable to close said breaker and biased to open said breaker, an energy storing device, motor means for storing energy in said device and for holding the energy stored in said device, means connecting said energy storing device to said operating member for transmitting the energy when released to said member to close said breaker, means for operating said motor to successively release said stored energy and to restore energy in said device.

4. In a control apparatus for a circuit breaker an operating member biased to open the breaker and movable to close said breaker, a spiral power spring, a motor means for rotating one end of said spring to wind said spring and store energy therein, a trip free lever mechanism connecting said spring and said operating member for transmitting the energy stored in said spring to the operating member to close the breaker when said energy is released, means for holding said spring in wound energy stored position, means for releasing said spring, a trip device for releasably holding said operating member in the closed circuit position, and means for releasing said last mentioned holding means.

5. In a control apparatus for a circuit breaker, an operating member biased to open the breaker and movable to close the breaker, an energy storing device, motor means operable through a cycle to release energy stored in said device, to restore energy in said device and to hold said energy stored in said device at the completion of the cycle, trip free connecting means between said energy storing device and said operating member for releasably holding said operating member in the closed position, and for transmitting the energy stored in said device to said operating member to close the breaker when said energy is released, a trip device operable on said connecting means for releasing said operating member, and control means for operating said motor through a cycle.

6. In a control apparatus for a circuit breaker an operating member biased to an open circuit position to open said breaker and movable to a closed circuit position to close said breaker, a spiral power spring, means for flexing said spring to store energy in the same and for holding said spring in flexed position, a compound lever comprising a main lever having a fixed pivot point, and a second lever pivoted to the free end of said main lever, said operating member being pivotally connected to the second lever, a pair of latch members the first adapted to releasably hold the free end of said second lever to hold the operating member in the closed circuit position, and the second adapted to releasably hold the free end of said main lever, said second lever when released being moved by the operating member in moving to its open circuit position to a tripped position and having means for releasing said second latch to free said main lever when moving toward said position, means biasing said main lever about its pivot toward a position in which it causes the free end of said second lever to be reengaged by said first latch, a toggle linkage having one link thereof pivotally connected to said main lever and the other link thereof pivoted about a fixed point, a lever pivoted at one end to the knee pivot of said toggle linkage, and provided with a slot in the other end thereof, a pin secured for movement with said power spring and disposed in said slot, means for releasing said spring holding means to effect movement of said operating member to its closed position through said levers, and a trip device for releasing said first latch to allow said operating member to move to the open circuit position.

7. In a control apparatus for a circuit breaker, a breaker operating member, an energy storing device, means for storing energy in said device and for releasably holding the energy stored therein, a trip free lever mechanism interconnecting said energy storing device and said operating member to transmit the energy stored in said device when released to said operating member to close said breaker, and means for operating said first mentioned means for releasing the energy and for simultaneously starting an energy restoring operation.

8. In a control apparatus for a circuit breaker, a breaker operating member biased to open the breaker and movable to close said breaker, a spiral power spring, motor means operable through a cycle for flexing said spring to charge the same, means for releasably holding said spring flexed, a trip free connecting means between said spring and said operating member for transmitting the energy stored in said spring when released to said operating member to close the breaker, means operable through said connecting means for releasably holding said operating member in the position in which said breaker is closed, a trip device for releasing said last mentioned holding means to allow said breaker to open, and means responsive to opening of the breaker for releasing said power spring and starting said motor means.

9. In a control apparatus for a circuit breaker, an operating member connected to said breaker to move the same to an open or to a closed circuit position, a spiral power spring, a relatively fixed shaft, means for securing the inner end of said spring to said shaft, a bail rotatable about said shaft and having one end secured to the free end of said spring, motor means for rotating said bail to a position to flex said spring for storing energy in the same, means for releasably holding said bail in said position, and means for transmitting the energy stored in said spring when released to said operating member.

10. In a control apparatus for a circuit breaker an operating member biased to open the breaker and movable to close said breaker, an energy storing device, a motor means operable through a cycle to successively release the energy stored in said device, restore energy in said device and at the completion of the cycle to hold said energy stored in the device, a trip free connecting means connecting said energy storing device and said operating member for transmitting the energy when released to said operating member to move said operating member to close the breaker, a releasable means for holding said operating member through said connecting means in the position in which the breaker is closed, a trip device operable to release said holding means, and means for operating said motor means through a cycle.

11. In a control apparatus for a circuit breaker an operating member biased to open the breaker and movable to close said breaker, a spiral power spring, motor operated means for rotating one end of said spring to wind said spring and store energy therein, latch means for releasably holding the spring in wound energy stored position, a trip free connecting means between said spring and said operating member for transmitting the energy when said spring is released to said operating member to move the same to close the breaker, means operable through said connecting means for holding said operating member in the position in which the breaker is closed, a trip device for releasing said last mentioned holding means to allow the operating member to open the breaker, and means for releasing said latch.

12. In a control apparatus for a circuit breaker, an operating member for the breaker movable to an open or to a closed circuit position for opening or closing the breaker, a spiral power spring having one end fixed, motor operated means for flexing said spring to store energy in the same, trip free means connecting said power spring to said operating member, means for holding said spring in flexed position, means for releasing said holding means to cause the energy stored in said spring to be transmitted through said connecting means to move said operating member to the closed circuit position and for simultaneously operating said motor to restore energy in said spring, and a trip device operable upon the occurrence of predetermined conditions, to cause said operating member to move to the open circuit position.

13. In a control apparatus for a circuit breaker an operating member movable to an open or to a closed circuit position to open or to close said breaker, an energy storing device, means for storing energy in said device, means for holding said energy stored in said device, a trip free lever mechanism connecting said energy storing device to said operating member to transmit the energy stored in said device to said operating member to move the same to a closed circuit position when said energy is released, means for releasing said stored energy and simultaneously operating said energy storing means, and a trip device operable in response to predetermined conditions to cause said operating member to move to the open circuit position.

14. In a control apparatus for a circuit breaker, an operating member for a circuit breaker biased to open the breaker and movable to close the breaker, an energy storing device, means for storing energy in said device, means for holding the energy stored in said device, a trip free lever mechanism connecting said energy storing device and said operating member, operable to transmit the energy when released to said operating member to move the same to close the breaker, means acting through a part of said lever mechanism to hold said operating member in closed circuit position, a trip device for releasing said last mentioned holding means, and means for releasing said first mentioned holding means and simultaneously operating said energy storing means.

15. In a control apparatus for a circuit breaker an operating member movable to an open or closed circuit position to open or close the breaker and biased to the open circuit position, a spiral power spring, a relatively fixed shaft, one end of said spring being fixed to said shaft, a bail rotatable about said shaft, means securing the free end of said spring to said bail, motor means operable through a cycle to rotate said bail to a position to flex said spring for storing energy therein, means for releasably holding said bail in said position with said spring flexed, a trip free connecting means between said bail and said operating member for transmitting the energy stored in said spring to said operating member to close said breaker when said bail is released, means operable through said connecting means for holding said operating member in the closed circuit position, a trip device for releasing said holding means to allow said operating member to move to the open circuit position, and means for simultaneously releasing said bail holding means and starting said motor means.

16. In a control apparatus for a circuit breaker, an operating member connected to the breaker to open or close the same, said member being biased to open the breaker, a power spring, means for adjustably holding one end of said spring, means for flexing said spring to store energy therein, a pin mounted for movement with the other end of said spring, means for releasably holding said spring in flexed position, a compound lever comprising a main lever pivoted at one end to a support and a second lever pivoted to the free end of said main lever normally occupying a position substantially parallel to said main lever with the free end of said second lever adjacent said pivoted end of the main lever when said breaker is closed, a latch for releasably holding the free end of said second lever in said position, said operating member being pivotally connected to said second lever, a second latch for releasably holding the free end of said main lever, said second lever having means for releasing said second latch when released, means biasing said main lever to cause said main lever to rotate when released to a position in which the free end of said second lever reengages said first latch, a pair of toggle links having one end thereof pivoted to said main lever and the other end thereof pivoted to a fixed support, a third lever having one end pivoted to the knee pivot of said toggle links and the other end provided with a slot for receiving said pin, means for releasing said spring holding means to close the breaker, and a trip device for releasing the first mentioned latch.

17. In a control apparatus for a circuit breaker an operating member connected to the breaker to open or close the same, one or more spiral power springs, means for adjustably holding one end of said springs, a bail secured to the other end of said springs, means for moving said bail to flex said springs and store energy in the same, means for releasably holding said bail in position with said springs flexed, a trip free lever mechanism interconnecting said bail and said operating member for transmitting the energy in said springs when released to said operating member to close said switch, means for releasing said holding means and successively operating said means for moving said bail to restore energy in said springs.

18. In a control apparatus for a circuit breaker, an operating member movable to an open or to a closed circuit position to open or close the breaker and biased to the open circuit position, a spiral power spring having one end relatively fixed and a bail secured to the other end thereof, a motor driven crank arm operable through a cycle to successively release said bail allowing said spring to discharge its energy, rotate said bail to flex said spring and recharge the same, and at the end of said cycle, to hold said bail in position with said spring flexed, a trip free lever mechanism connecting said bail to said operating member for transmitting the energy stored in said spring when released to said operating member to move the same to closed circuit position and means including a motor for rotating said crank arm through a cycle.

19. In a control apparatus for circuit breakers, an operating member connected to the breaker and movable to an open circuit or to a closed circuit position to open or to close the breaker, said member being biased to the open circuit position, a spiral power spring, motor means operable through a cycle for flexing said spring to store energy therein, means for holding said spring in flexed position, a trip free connecting means between said spring and said operating member operable to transmit the stored energy in said spring when released to said operating member to move the same to closed circuit position, means operable through a part of said connecting means for releasably holding said operating member in the closed circuit position, a trip device for releasing said last mentioned holding means in response to predetermined conditions to allow said operating member to move to the open circuit position, and means for releasing said first mentioned holding means to release the energy stored in said spring and for simultaneously starting the motor to again flex the spring to store energy therein.

20. In a control apparatus for circuit breakers, an operating member connected to the breaker and movable to an open circuit or to a closed circuit position to open or to close the breaker, said member being biased to the open circuit position, a spiral power spring, motor means operable through a cycle for flexing said spring to store energy therein, means for releasably holding said spring in flexed position, a trip free connecting means between said spring and said operating member operable to transmit the stored energy in said spring when released to said operating member to move the same to closed circuit position, means operable through a part of said connecting means for releasably holding said operating member in the closed circuit position, a trip device for releasing said last mentioned holding means in response to predetermined conditions to allow said operating member to move to the open circuit position, and means operated by the movement of the operating member toward open circuit position to release said spring holding means and to start said motor.

21. In a control apparatus for a circuit breaker, an operating member connected to the breaker to open or close the same, energy storing means comprising a shaft, a spiral power spring having its inner end secured to a portion of said shaft, a U shaped bail having its legs rotatably mounted on said shaft, means for securing the free end of said spiral spring to the bight of the U shaped bail, means for adjusting the rotary position of said shaft to initially tension said spring, means including a motor driven crank arm for flexing said spring to store energy therein, means for releasably holding said bail with said spring flexed, connecting means between said bail and said operating member to transmit the energy stored in said spring, when released to said operating member to close said breaker, and means for releasing said holding means.

22. In a control apparatus for a switch, an operating member connected to the switch movable to an open or to a closed circuit position to open or to close said switch, actuating means for closing said switch comprising a shaft, a spiral power spring having its inner end secured to said shaft, a U shaped bail having its bight secured to the free end of said spring and its legs straddling the spring and pivotally mounted on said shaft, means for partially rotating said bail to flex said spring and thus store energy therein, means for releasably holding said bail in a position with said spring flexed, trip free connecting means between said bail and said operating member for transmitting the energy stored in said spring when the bail is released to said operating member to move the same to its closed circuit position, and means for releasing said holding means.

23. In a control apparatus for a switch, an operating member connected to the switch movable to an open or to a closed circuit position to open or to close said switch and biased to the open position, actuating means for closing said switch comprising a shaft, a spiral power spring having its inner end secured to said shaft, a U shaped bail having its bight secured to the free end of said spring and its legs straddling the spring and pivotally mounted on said shaft, means including said shaft for adjusting the initial tension of said spring, means for rotating said bail to flex said spring and thus store energy therein, means for releasably holding said bail in a position with said spring flexed, trip free connecting means between said bail and said operating member for transmitting the energy stored in said spring when the bail is released to said operating member to move the same to its closed circuit position, means operable through said connecting means for releasably holding the operating member in the closed circuit position, and a trip device for releasing said last mentioned holding means to allow said operating member to move to its open circuit position, and means for releasing said bail holding means.

24. In a control apparatus for a circuit breaker, an operating member connected to the breaker movable to an open circuit position or to a closed circuit position to open or close said breaker, said member being biased to the open circuit position, a spiral power spring, means operable through a cycle for flexing the spring to store energy therein, means for releasably holding said spring in flexed position, trip free connecting means between said spring and said operating member for transmitting the energy stored in said spring when released to said operating member to move the same to the closed circuit position, latch means operable through said connecting means to hold said operating member in the closed circuit position, a trip device responsive to predetermined conditions to release said latch means to allow said operating member to move to the open circuit position, and means for simultaneously releasing said spring holding means and starting said spring flexing means.

25. In control apparatus for a circuit breaker the combination of an operating member connected to the breaker for opening and closing the breaker, a power spring, means for releasably holding the power spring in tensioned position with energy stored therein, a trip free connecting means between said spring and said operating member for transmitting the energy when released from said spring to said operating member to close the breaker, said connecting means comprising a pin connected to said spring for movement therewith, and a lever connected to said operating member provided with a slot for receiving said pin; and means for releasing said holding means and for automatically re-tensioning said spring after it has discharged its energy.

26. In a control apparatus for a switch, the combination of a switch operating member biased to open the switch and movable to close the same, a spiral power spring, motor means for rotating one end of said spring to wind said spring and store energy therein, means for releasably holding said spring in wound position with energy stored therein, a trip free connecting means between said spring and said operating member for transmitting the stored energy when released from said spring to said operating member to close said switch, means for releasing said holding means and for simultaneously starting said motor means to rewind said spring, means acting through said connecting means for releasably holding said operating member in the position in which said switch is closed, and a trip device for releasing said last mentioned holding means.

27. In a circuit controlling apparatus, the combination of a circuit breaker, means operable to cause opening of said breaker, an energy storing device releasable to close said breaker, means for storing energy in said device, means for holding the energy stored in said device, and means for releasing the stored energy to close the breaker and simultaneously initiating operation of the energy storing means.

28. In a circuit controlling apparatus, the combination of a circuit breaker, means operable to cause opening of said breaker, a power spring releasable to close said breaker, means for flexing said spring to store energy therein, means holding the spring flexed, and means for releasing said spring to close the breaker and simultaneously initiating operation of said means for flexing the spring.

29. In a circuit controlling apparatus, the combination of a circuit breaker, means operable to cause opening of said breaker, an energy storing device for closing said breaker, means for storing energy in said device, means for holding the energy stored in said device, and means operable by the movement of the breaker toward open position to release the stored energy to close the breaker and simultaneously initiate operation of the energy storing means.

JOSEPH W. OW.
ERNEST K. READ.